US007429914B2

(12) United States Patent
Carlson et al.

(10) Patent No.: US 7,429,914 B2
(45) Date of Patent: Sep. 30, 2008

(54) SYSTEM AND METHOD FOR CDMA GEOLOCATION

(75) Inventors: John Peter Carlson, Herndon, VA (US); Thomas Booker Gravely, Herndon, VA (US); Joseph P. Kennedy, Great Falls, VA (US); James T. McDaniel, Jr., Ashburn, VA (US)

(73) Assignee: Andrew Corporation, Melbourne, FL (US)

( * ) Notice: Subject to any disclaimer, the term of this patent is extended or adjusted under 35 U.S.C. 154(b) by 295 days.

(21) Appl. No.: 11/008,154

(22) Filed: Dec. 10, 2004

(65) Prior Publication Data

US 2005/0192026 A1 Sep. 1, 2005

(51) Int. Cl.
*G09F 25/00* (2006.01)
*H04Q 7/00* (2006.01)
*G08C 19/00* (2006.01)

(52) U.S. Cl. ............................. 340/286.01; 340/539.1; 340/539.11; 340/539.13; 340/825.69; 340/825.72; 455/521; 455/522; 455/455; 455/456.1; 455/456.3; 455/456.5; 455/456.6; 370/318; 370/331

(58) Field of Classification Search .................. None
See application file for complete search history.

(56) References Cited

U.S. PATENT DOCUMENTS

| | | | |
|---|---|---|---|
| 4,728,959 A | 3/1988 | Maloney et al. | |
| 4,814,751 A | 3/1989 | Hawkins et al. | |
| 4,845,504 A | 7/1989 | Roberts et al. | |
| 4,891,650 A | 1/1990 | Sheffer | |
| 5,056,106 A | 10/1991 | Wang et al. | |
| 5,218,618 A | 6/1993 | Sagey | |
| 5,245,629 A * | 9/1993 | Hall | 455/522 |
| 5,317,323 A | 5/1994 | Kennedy et al. | |
| 5,327,144 A | 7/1994 | Stilp et al. | |
| 5,365,544 A | 11/1994 | Schilling | |
| 5,404,376 A | 4/1995 | Dent | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,592,180 A | 1/1997 | Yokev et al. | |
| 5,614,914 A | 3/1997 | Bolgiano et al. | |

(Continued)

FOREIGN PATENT DOCUMENTS

AU 740903 11/2001

*Primary Examiner*—Julie Lieu
(74) *Attorney, Agent, or Firm*—Duane Morris LLP (57) ABSTRACT

A system and method is disclosed for determining the location of a mobile appliance using the reverse pilot channel provided in CDMA 2000 communication systems to determine an attribute (e.g., time of arrival, angle of arrival, time difference of arrival, received power level) of a reverse pilot signal at one or more wireless location sensors. A network overlay of wireless location sensors monitors the reverse pilot channel for a target mobile's reverse pilot signal. The monitored signal may be compared to a reference signal to determine a correlation and thereby determine an attribute of the target mobile's reverse pilot signal. The method may be performed independently from the communication system and without requiring retrieval of information bits from the mobile appliance. The reference signal may be generated from the unique long spreading code mask of the target mobile appliance which is typically a function of the ESN of the target mobile appliance.

72 Claims, 7 Drawing Sheets

U.S. PATENT DOCUMENTS

| | | |
|---|---|---|
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,900,838 A | 5/1999 | Khan et al. |
| 5,901,358 A | 5/1999 | Petty et al. |
| 5,914,687 A | 6/1999 | Rose |
| 5,920,278 A | 7/1999 | Tyler et al. |
| 5,945,948 A | 8/1999 | Buford et al. |
| 5,959,580 A | 9/1999 | Maloney et al. |
| 5,960,341 A | 9/1999 | Leblanc et al. |
| 5,970,413 A | 10/1999 | Gilhousen |
| 5,991,329 A * | 11/1999 | Lomp et al. ............ 375/130 |
| 6,047,192 A | 4/2000 | Maloney et al. |
| 6,097,336 A | 8/2000 | Stilp |
| 6,108,555 A | 8/2000 | Maloney et al. |
| 6,119,013 A | 9/2000 | Maloney et al. |
| 6,127,975 A | 10/2000 | Maloney |
| 6,184,829 B1 | 2/2001 | Stilp |
| 6,233,459 B1 | 5/2001 | Sullivan et al. |
| 6,246,884 B1 * | 6/2001 | Karmi et al. ............ 455/521 |
| 6,281,834 B1 | 8/2001 | Stilp |
| 6,288,675 B1 | 9/2001 | Maloney |
| 6,288,676 B1 | 9/2001 | Maloney |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,366,241 B2 | 4/2002 | Pack et al. |
| 6,400,320 B1 | 6/2002 | Stilp et al. |
| 6,456,604 B1 * | 9/2002 | Lee et al. ............ 370/328 |
| 6,463,290 B1 | 10/2002 | Stilp et al. |
| 6,646,604 B2 | 11/2003 | Anderson |
| 7,190,964 B2 * | 3/2007 | Damnjanovic et al. ...... 455/522 |
| 2006/0003695 A1* | 1/2006 | Kennedy et al. ............ 455/9 |

* cited by examiner

SYSTEM AND METHOD FOR CDMA GEOLOCATION

PRIORITY CLAIM

This application claims priority from the following co-pending and commonly-assigned applications: U.S. utility patent application Ser. No. 10/004,449 entitled "Pseudolite Positioning System and Method" filed 6 Dec. 2001; and, International application No. PCT/US03/17470 filed 4 Jun. 2003.

BACKGROUND

To support FCC E911 rules to locate wireless 911 callers, as well as to support other location-enabled services, some providers of wireless communication services are installing mobile appliance location capabilities into their wireless networks. These wireless networks typically include at least one base station. One such type of mobile appliance location system is known in the art as a network overlay location system. Such systems typically, but not necessarily, include the addition of some software and/or hardware systems to the base stations of the wireless networks. In operation, these network overlay location systems may include one or more wireless location sensors ("WLS") which may take certain measurements of RF transmissions from a mobile appliance for which the geolocation is desired. The network overlay system may also include a geolocation control system (sometimes referred to as a geolocation control server) ("GCS") which may estimate the location of the mobile appliance based at least in part on the measurements obtained by the WLSs. The WLSs and/or the GCS may be co-located with the base station of the wireless network. Furthermore, the location of the mobile appliance may be determined with respect to one or more base stations. Since the geographic location of the base stations is typically known, the determination of the location of the mobile appliance with respect to the base station permits the geographic location of the mobile appliance to be determined. Similarly, if the geographic location of the WLS is known, then the location of the mobile appliance with respect to the WLS may be determined. The RF measurements of the transmitted signal at the WLS may include, but is not limited to, the time-of-arrival, time difference of arrival, angle of arrival, signal power, or unique/repeatable radio propagation path (radio fingerprinting) derivable features. In addition, some geolocation systems can also use collateral information, e.g., information other than that derived from the RF measurement to assist in the geolocation of the mobile appliance, i.e., location of roads, dead-reckoning, topography, map matching, etc.

As used herein, a mobile appliance may be, but is not limited to, any one or more of the following: laptop computer, mobile telephone, mobile radio, walkie-talkie, personal digital assistant, pager, personal tracking device, vehicle, automotive anti-theft device, telemetry device, fleet tracking device, anti-location fraud device, or any other similar device or system for which the geolocation of the device or system is desired.

In a network-based geolocation system, the mobile appliance to be located is typically identified and radio channel assignments determined by, for example, monitoring the control information transmitted on a radio channel for telephone calls being placed by the mobile appliance to detect calls of interest, e.g., 911 calls, or a location request provided by a non-mobile appliance source, i.e., an enhanced services provider. Once a mobile appliance to be located has been identified and radio channel assignments determined, the location determining system is tasked to determine the geolocation of the mobile appliance, and report the determined position to an appropriate entity, such as a mobile call center or enhanced services provider.

Some prior art systems are mobile appliance-based and determine the position of the mobile appliance by receiving multiple dedicated location signals either from components outside the mobile appliance's communication system, such as satellites and GPS systems or from a network of dedicated land-based antennas. Other prior art geolocation systems that are network overlay, or infrastructure-based, systems use combinations of specific, as opposed to ambiguous, measurements generally from multiple base stations, such as angle of arrival, time-of-arrival, and time-difference-of-arrival. These specific measurement values are used to solve a set of mathematical equations to determine the location of the mobile appliance.

One prior art example of geolocation is based on time-difference-of-arrival ("TDOA") of radio signals at a plurality of base stations. One prior art TDOA system is described in U.S. Pat. No. 5,327,144 to Stilp, et al. Another type of TDOA system is described in U.S. Pat. No. 5,317,323 to Kennedy, et al. for which the present inventor is a co-inventor. TDOA systems, such as the two previously mentioned and others, measure the time-of-arrival at a single or multiple antennas at a plurality of base stations of a radio signal emitted by a transmitter. The time-of-arrival is used to define sets of hyperbolic surfaces which determine possible locations of the transmitter between each pair of base stations receiving the radio signal. The intersection of these hyperbolic surfaces defines the location of the transmitter. The underlying technique of TDOA systems relies on geometric equations and the constant speed of the radio signal.

As mentioned above, the prior art systems rely on determining a channel assignment by monitoring the control information transmitted on a radio channel for telephone calls being placed by the mobile appliance to thereby detect calls of interest or a location request provided by a non-mobile appliance source, e.g., an enhanced services provider. In either case the identification of the mobile user and its channel assignment necessitate retrieval of information bits from the mobile appliance, through control signals or call setup information. However with the advent of the third generation CDMA specification known in the art as CDMA2000, a new system and method can be used to determine the location of a mobile appliance independent of the information data bits transmitted by the mobile appliance.

Figure 1:
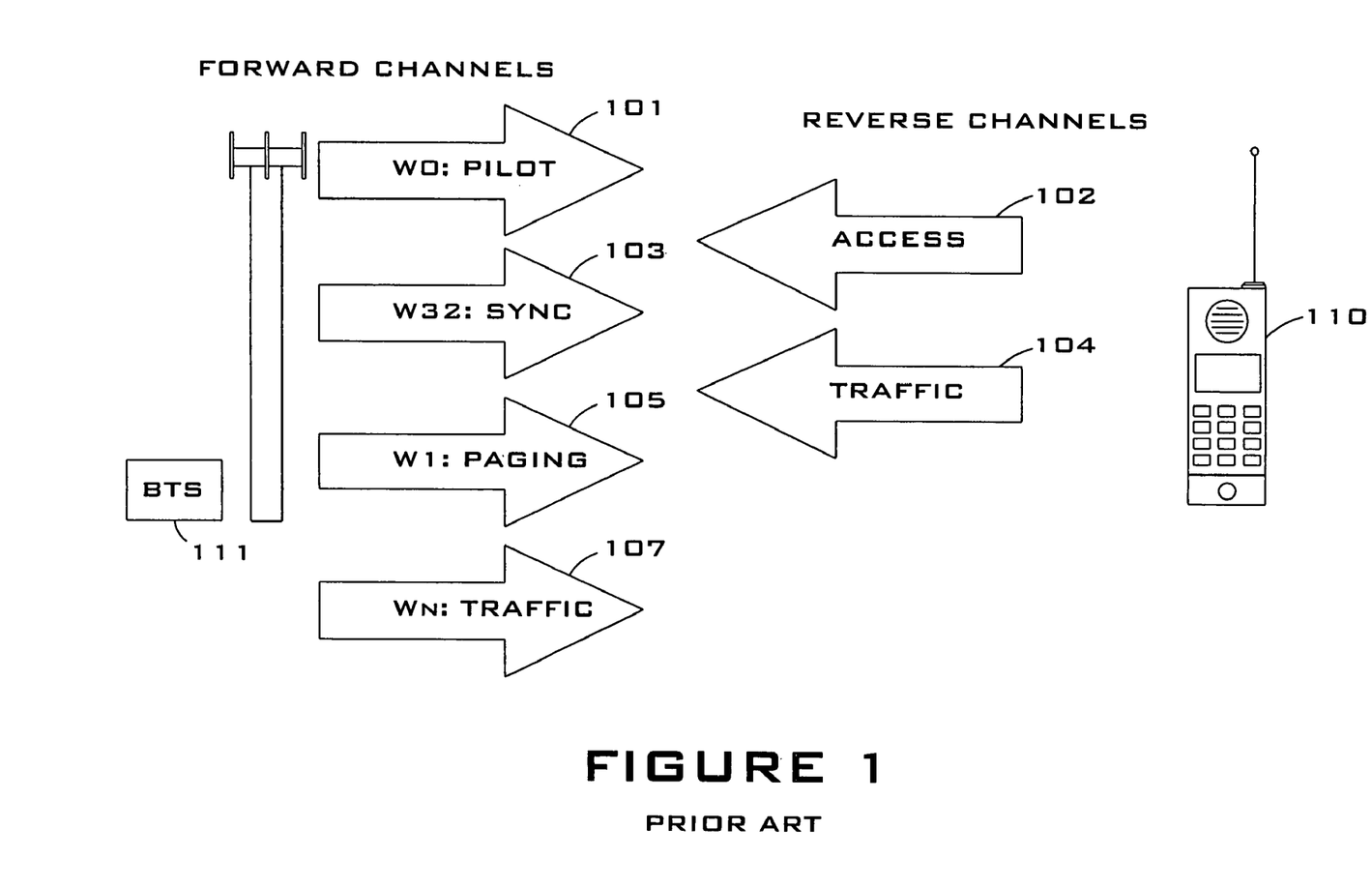
FIG. 1 is a representation of IS-95 CDMA channels.
Figure 2:
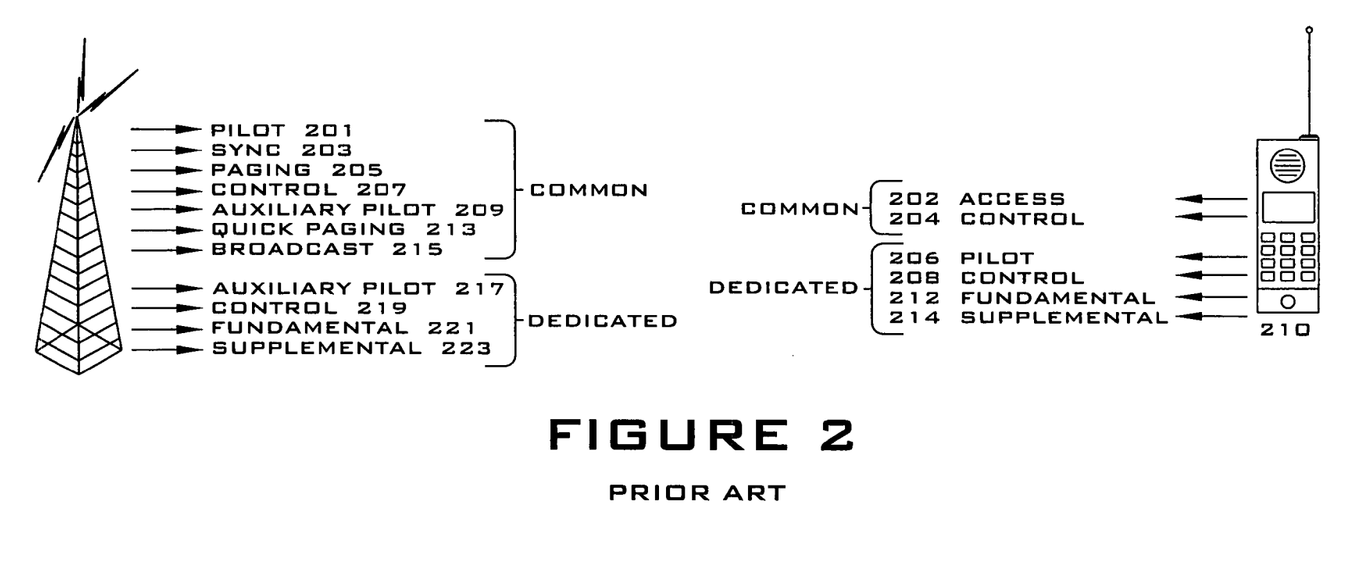
FIG. 2 is a representation of IS-2000 CDMA channels.

Idealized wireless systems operating under the IS-95 standard and the IS-2000 standard are shown pictorially in FIGS. 1 and 2, respectfully. The IS-95A/JStd-008 offers one physical structure using the forward channels, Pilot 101, Synchronization 103, Paging 105 and Traffic 107 from a base station 111; and reverse channels, Access 102 and Traffic 104 from the mobile appliance 110.

The IS-2000 standard in FIG. 2 includes numerous common and dedicated channels in both the forward and reverse direction. The forward channels include Pilot 201, Sync 203, Paging 205, Control 207, Auxiliary Pilot 209, Quick Paging 213, and Broadcast 215 as common channels and Auxiliary Pilot 217, Control 219, Fundamental 221, and Supplemental 223 as dedicated channels from the base station 211. The reverse channels include Access 202 and Control 204 as common channels and Pilot 206, Control 208, Fundamental 212 and Supplemental 214 as dedicated channels from the mobile appliance 210.

In a system operating under the IS-95 standard, the forward link uses the pilot, paging, and sync control channels to maintain the link while the forward traffic channel is used for data and voice communication. On the reverse link, the mobile access channel is used to gain access to the system and the traffic channel is used for data and voice transfer.

In a system operating under the CDMA2000 IS-2000 standard, the IS-95 forward link channels are used in addition to a dedicated reverse pilot channel from the mobile appliance to the base station. The reverse pilot signal is unique for each mobile appliance and is typically a function of the Electronic Serial Number ("ESN"). The reverse pilot signal identifies the mobile appliance and typically incorporates a time reference so subsequent data sent by the mobile appliance can be very quickly decoded at the base station. The reverse pilot channel typically is used, for example, for coherent demodulation, multi-source combining, and identification of a mobile appliance. For IS-95 systems, a network overlay geolocation system for geolocating a mobile appliance typically entailed transferring a large amount of information through the geolocation system in order to geolocate a mobile appliance.

The ESN of a mobile appliance may typically be determined, as is known in the art, from the location requesting entity (which is separate from the wireless communication system), from control channels, from certain signaling present in the wired portion of the wireless communication system, or other such methods.

The details of the reverse pilot signal in a CDMA2000 wireless communication system are established by the Telecommunications Industry Association ("TIA"), as is known to those of skill in the art.

The existence of the reverse pilot channel in IS-2000 communication systems presents a new resource for efficiently geolocating a mobile appliance. Therefore, there is a need in view of the functionality afforded by the new CDMA2000 specifications to utilize the characteristics of the reverse pilot channel in creating a system and method for geolocating a mobile appliance operating in a wireless communication system under the CDMA2000 specifications.

In order to obviate the deficiencies in the prior art it is an object of the present disclosure to present an improved method of determining the location of a mobile appliance in a wireless communication system having plural receiver stations (e.g., base stations) for communicating with the mobile appliance, including a reverse pilot signal transmitted by the mobile appliance to be used by the receiving stations to coherently demodulate the mobile appliance's transmissions. The improvement comprising determining the location of the mobile appliance based on the time difference of arrival of the reverse pilot signal at one or more geolocating receivers (e.g., WLS).

It is also an object of the present disclosure to present a novel method of geolocating a mobile appliance in a wireless communication system having plural receiver stations for communicating with at least one mobile appliance wherein the communication system has a reverse pilot channel used by the plural receiver stations for coherently demodulating transmissions from the mobile appliances operating in the system. The method for determining the location of a respective one of the mobile appliances (i.e., the target mobile) includes the step of determining the time difference of arrival of a reverse pilot signal transmitted by the target mobile and received on the reverse pilot channel at one or more WLS.

It is another object of the present disclosure to present a novel method for estimating the location of a mobile appliance in a wireless communication system having plural base stations for communication with the mobile appliance. The method includes providing a reverse pilot channel and transmitting from the mobile appliance a reverse pilot signal over the reverse pilot channel for reception at one or more WLS. A GCS is also provided and used for determining the time of arrival of the reverse pilot signal at the one or more WLS. The GCS also determines a difference in time-of-arrival of the pilot channel at the one or more WLS and estimates the geolocation of the mobile appliance therefrom.

It is still another object of the present disclosure to present a novel mobile appliance location determining system as a network overlay to a wireless communication system including one or more base stations. The communication system includes multiple mobile appliances each transmitting a unique non-traffic signal. The network overlay system includes plural WLSs, one or more of which receive the non-traffic signal from the target mobile (i.e., the mobile appliance for which the geolocation is desired to be determined or estimated), and a geolocation processor (typically a GCS) in communication with the WLSs. The geolocation processor includes a reference signal generator for generating a reference signal, a cross-correlation device for determining time of arrival at one or more of the WLSs of the non-traffic signal from the target mobile, and a location estimator for estimating the location of the mobile appliance based on the time of arrival of the non-traffic signal from the target mobile at the one or more WLSs. The cross-correlation device may determine time of arrival based on a correlation of the non-traffic signal with the reference signal. Additionally, the WLSs need not be collocated with any of the base stations in the communication system.

It is yet another object of the present disclosure to present a novel method for determining the location of a target mobile appliance in a wireless communication system including one or more base stations wherein multiple WLSs are used to determine the location of the target mobile. The method includes transmitting from the target mobile a known spread spectrum sequence for establishing base station synchronization and receiving the sequence at one or more of the WLSs. The method further includes correlating the received spread spectrum sequence with a reference sequence to determine the time of arrival at each of the one or more WLSs, and estimating the location of the mobile appliance based on the time difference of arrival at of the spread spectrum sequence at the one or more WLSs.

It is an additional object of the present disclosure to present a novel mobile appliance location determining system in a wireless communication system including one or more base stations and having one or more mobile appliances emitting a dedicated reverse pilot signal on a reverse pilot channel. The location determining system includes one or more WLS that receive the reverse pilot signal of the target mobile wherein each of the one or more WLS is operatively connected to a geolocation processor in a GCS. The GCS includes a reference signal generator, a cross-correlation device, and a location estimator. The signal generator generates a reference signal based on the unique code mask of the target mobile, which is typically a function of the ESN of the target mobile. The cross-correlation device determines the time of arrival of the reverse pilot signal of the target mobile that is received over the reverse pilot channel at each of the one or more WLSs by correlating the received reverse pilot signal with the reference signal. The location estimator estimates the location of the target mobile based on the time of arrival and/or the time difference of arrival between sets of WLSs.

It is yet an additional object of the present disclosure to locate a mobile appliance whether or not the mobile appliance is engaged is transmitting/receiving voice traffic signals, data traffic signals, or no traffic signals. In other words, the inventive system and method of the present disclosure is capable of locating a mobile appliance independent of the "state" or "mode" of the mobile appliance.

One purpose of this disclosure is the location of a mobile appliance in a wireless communication system for the purpose of satisfying FCC E911 guidelines as well as other location based service guidelines. The embodiments presented may also deal with the location of mobile appliances that either continuously or periodically transmit known spread spectrum sequences, independent of the information data bits (i.e., traffic signal) being transmitted to/between the mobile appliance and/or a base station.

These and many other objects and advantages of the present invention will be readily apparent to one skilled in the art to which the invention pertains from a perusal of the claims, the appended drawings, and the following detailed description of the preferred embodiments.

DETAILED DESCRIPTION

Figure 3:
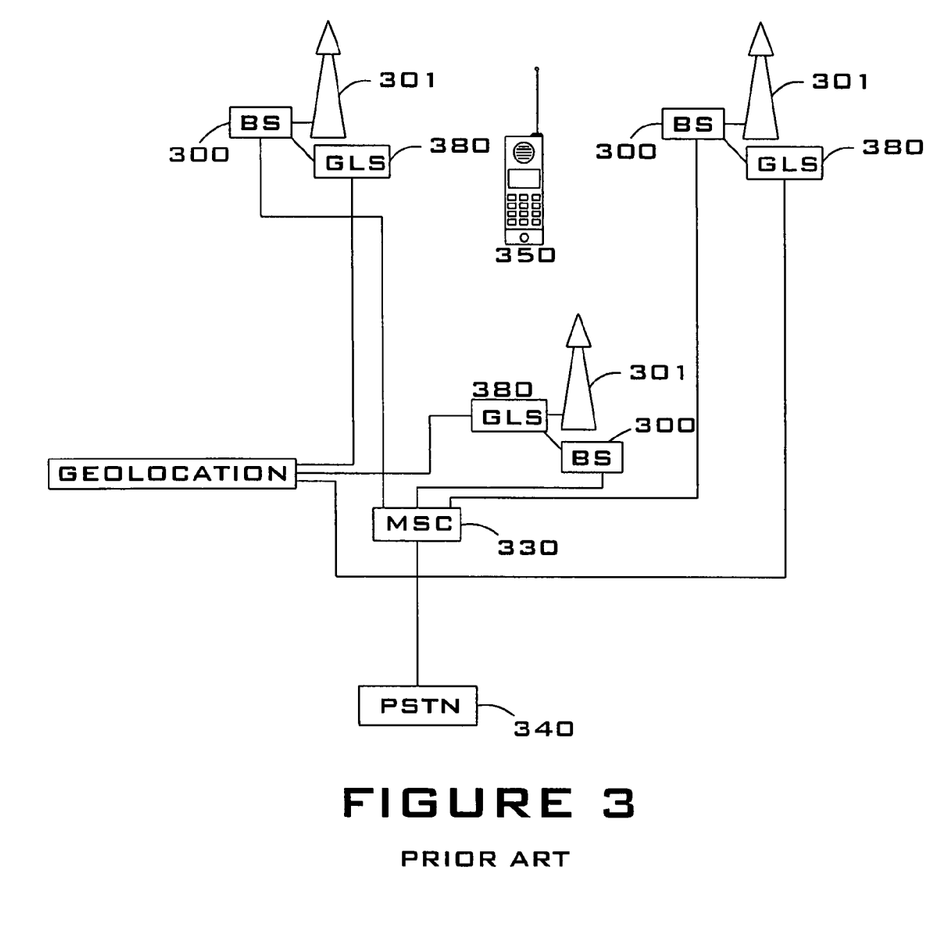
FIG. 3 is a schematic representation of a prior art geolocation system integrated with communications infrastructure.

With reference to FIG. 3, a typical prior art mobile communication system is depicted including three base stations 300 each with an associated antenna 301. The base stations are connected to a mobile switching center 330 which is an interface between the mobile communication system and the public switched telephone network ("PSTN") 340. The disclosed invention may operate in any mobile communication system with any number of base stations and is not limited to a system with three base stations. The antennas transmit signals to and receive signals from mobile appliances, such as the mobile appliance 350, wireless communication signals and pilot signals.

A typical geolocation subsystem ("GLS") 380 interfaces with a base station to retrieve the identity of the user derived from standard base station equipment and the assigned channels. Typical prior art geolocation subsystems use this information for estimating the position of a mobile appliance.

It should be noted, however, that the disclosed inventive system and method for locating a mobile appliance typically uses a network overlay such that one or more wireless location sensors (WLSs) receive a signal from the target mobile device (i.e., the mobile appliance for which the geolocation is to be determined) including a known sequence or sequences, and compute a location measurement based on an attribute of the target mobile's signal. Such an attribute may be, but is not limited to, time of arrival, angle of arrival, time difference of arrival, received power level, etc. The present inventive system and method is also equally operable with other such attributes of the target mobile's signal as are known in the art. The present inventive system and method can estimate the geolocation of the target mobile independent of current information supplied to the geolocation system by the wireless communication system to which the target mobile appliance communicates.

As an example, the time of arrival of the detected signal at one or more of the WLSs and the geolocation of the target mobile can be determined based on a priori information supplied to the network overlay geolocation system by the base station. It should also be noted that the present inventive system and method contemplates locating a mobile appliance that is "out of range" of a communication system to which the mobile appliance would normally be communicating.

Of particular interest is the ability to design a network overlay location system that can handle the highly complex signal structure of third generation CDMA communication system of IS-2000. In the CDMA2000 specification, as mentioned previously, there is a channel referred to as the "Reverse Pilot Channel" that is used by base stations in the communication system to coherently demodulate the mobile signal's transmissions. This reverse pilot channel is usually a signal comprised of an information bit sequence of zeros that has typically been quadrature scrambled by a pseudo-random sequence unique to each mobile appliance. This uniqueness is established by the fact that a specific 'long code mask' or "long spreading code" dictates the code phase state of a $2^{42}-1$ length binary sequence, which will be orthogonal or nearly orthogonal to all other mobile users sharing the same radio frequency channel resource. At the base stations, the signal is unscrambled by the unique long code state assigned to the specific user, and the "reverse pilot channel" can then be used as the transmitter carrier phase reference for coherent information bit demodulation.

Figure 4:
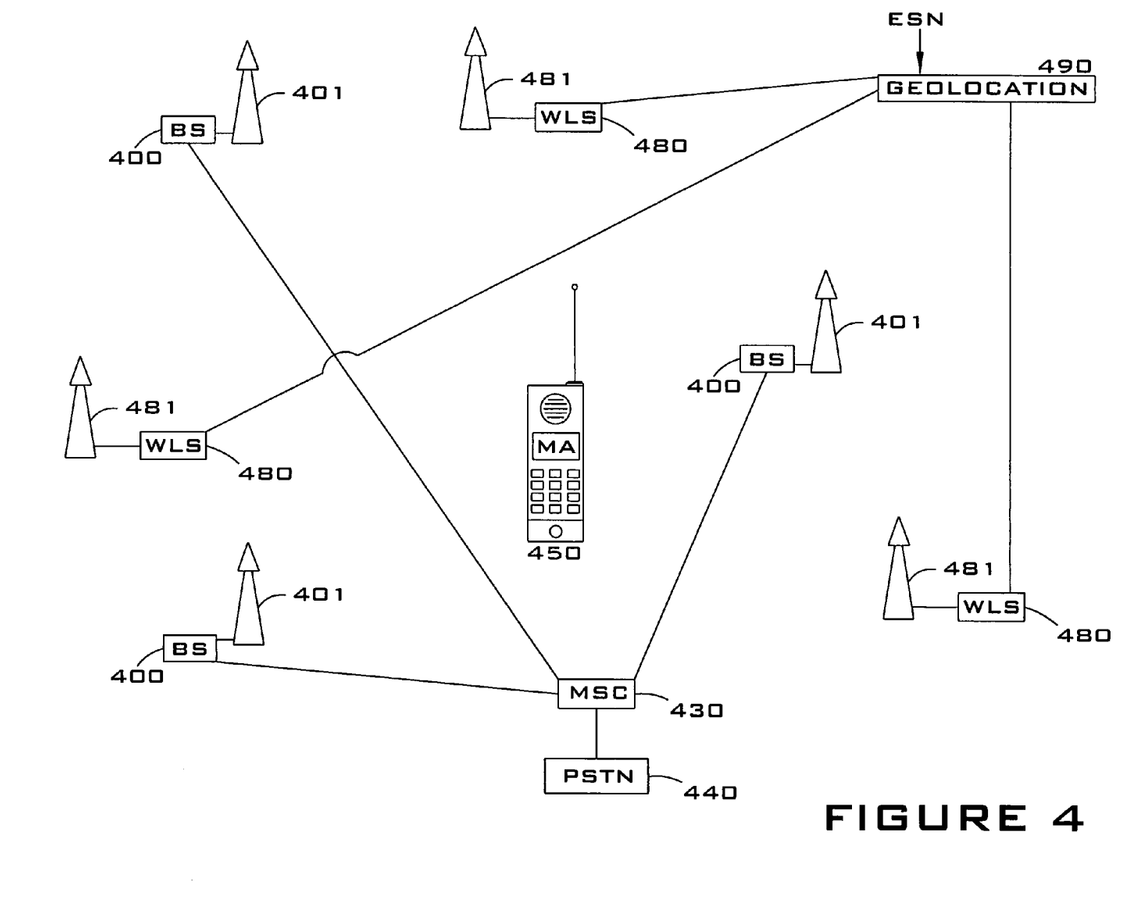
FIG. 4 is a representative schematic of a geolocation overlay along with the overlaid communication infrastructure according to the present disclosure.

FIG. 4 illustrates an embodiment of the present disclosure. A CDMA wireless communication system is shown with three base stations 400 and associated antenna 401. Each base station 400 is connected to a mobile switching center 430 which in turn is connected to a PSTN 440. The network overlay of the present disclosure comprises a plurality of wireless location sensors 480 with associated antenna 481 which are connected to a geolocation processor (or GCS) 490. As seen from the illustration in FIG. 4 the network overlay can be independent of the infrastructure or the wireless communication system, since no current information that requires connection to the system is needed to geolocate the mobile appliance 450. A priori known information such as the ESN for the mobile appliances of interest are known by the system. Integration into the base station infrastructure is however not precluded for other practical purposes. It is envisioned that the WLS and associated antennas may be at different locations as shown in FIG. 4 or co-located with the base stations utilizing common towers or other shared components.

Figure 5:
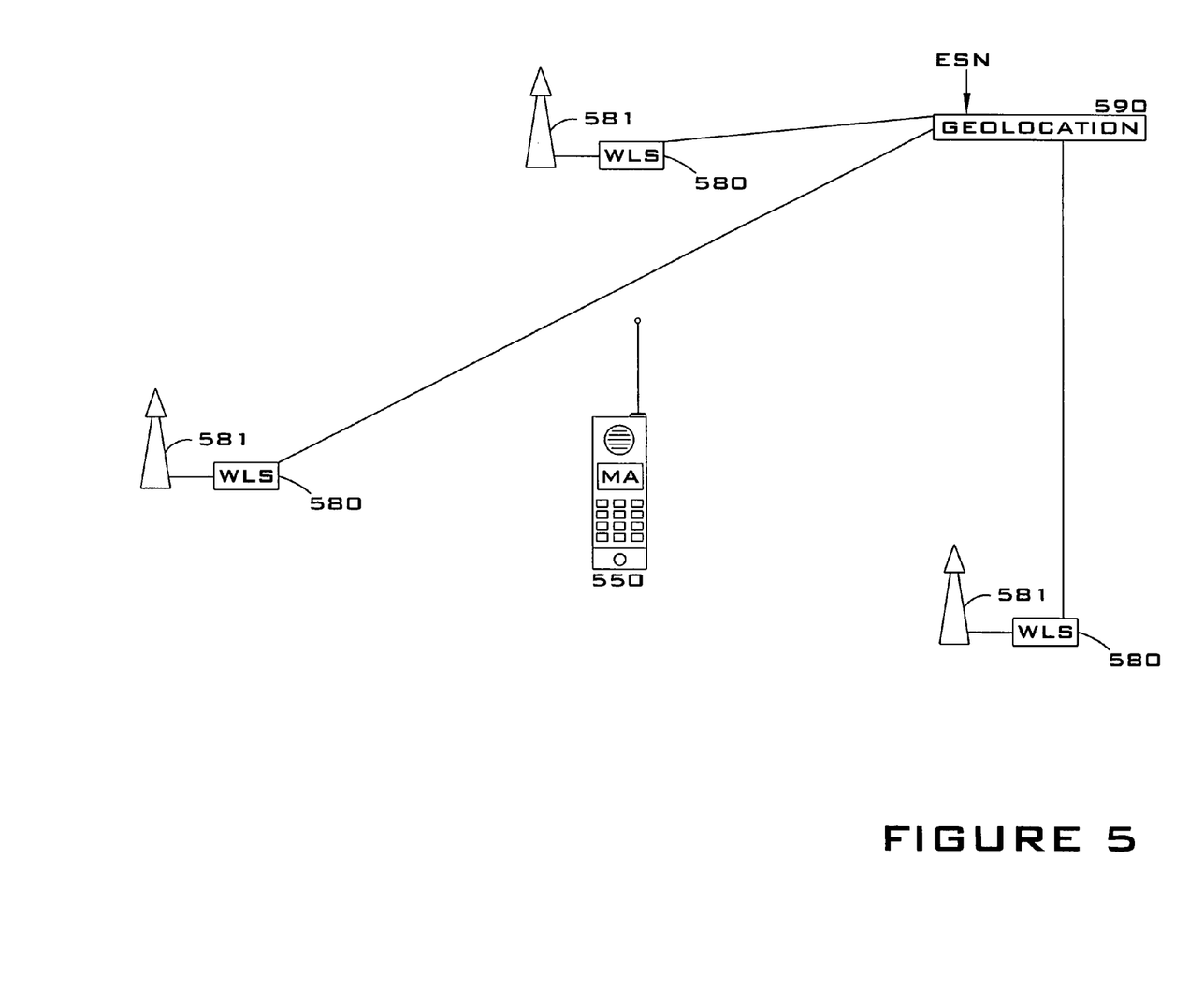
FIG. 5 is a representative schematic of a geolocation overlay according to the present disclosure without an underlying communication infrastructure.

FIG. 5 illustrates an embodiment of the geolocation system in isolation from the CDMA wireless communication system infrastructure. The overlay shown is the same as shown in FIG. 4 with like components identified by like numbers. The WLS 580 and associated antennae 581 are operationally connected to the geolocation processor 590 which uses the time difference of arrival of the reverse pilot signal at the WLSs to locate the mobile appliance 550. The overlay as disclose can thus facilitate geolocation in areas in which CDMA communication facilities (base stations, mobile switching center, etc) do not presently exist, because as mentioned above the overlay may operate independently of the base stations. This independent mode of operation is enabled wherever the reverse pilot signal for the mobile appliance of interest is being transmitted. An interface to an enhanced services provider or emergency services provider enables location information to be requested for these services.

The present disclosure exploits the fact that the known sequence, the reverse pilot channel, exists and is unique to each mobile appliance. The geolocation system attempts to detect the presence of this pilot signal, and measures its time of arrival at one or more WLSs which may or may not be collocated with the base stations.

Figure 6:
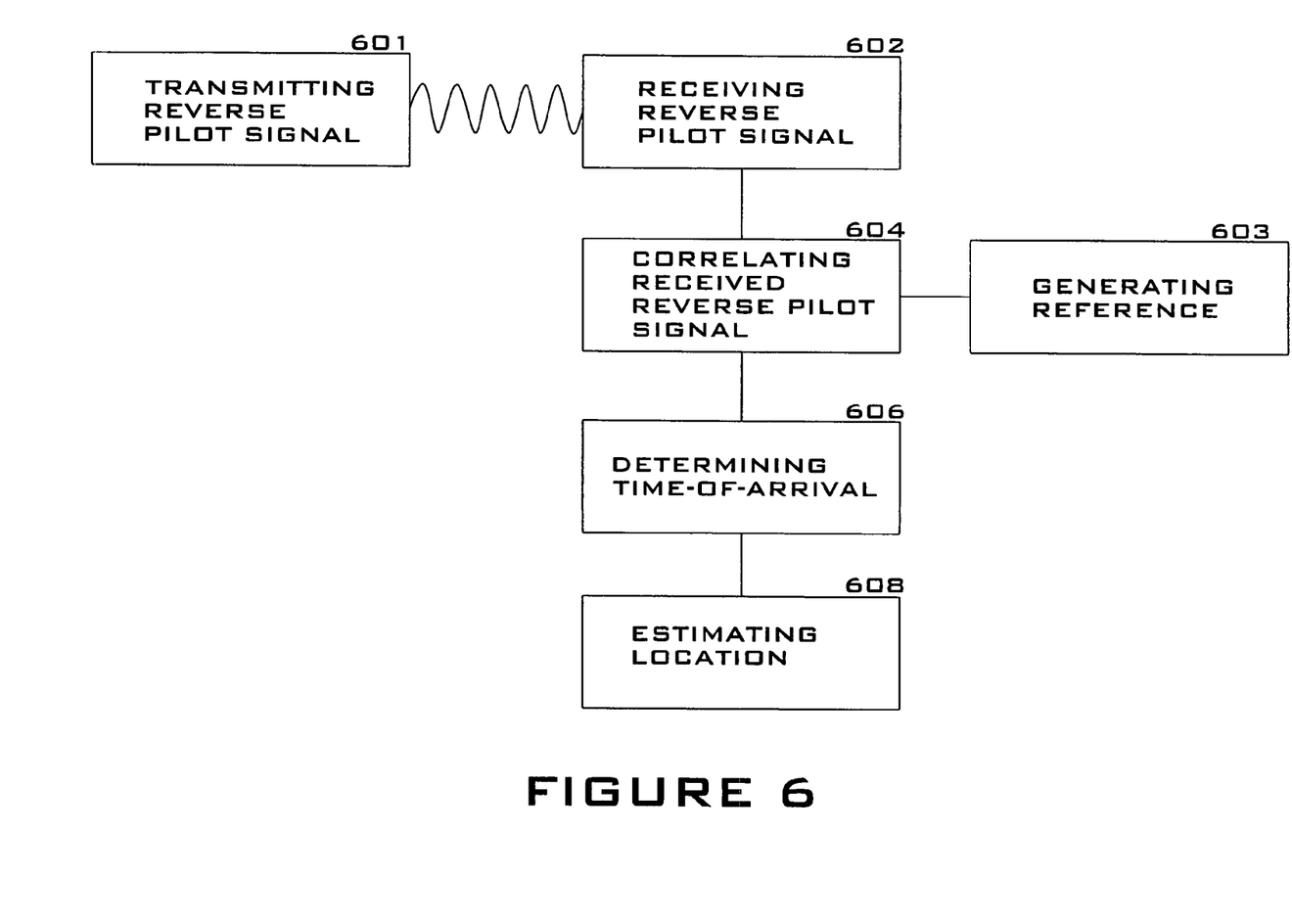
FIG. 6 is a representative flow chart of a method for geolocation of a mobile appliance according to the present disclosure.

FIG. 6 is a flow chart of an exemplary method for determining the location of a mobile appliance using a reverse pilot channel. The mobile appliance transmits a reverse pilot signal over a reverse pilot channel as indicated in block 601. The reverse pilot signal can be in accordance with IS2000 as discussed above or may be any other type of coded signal which represents a unique signature that can be discerned independent of traffic signals, wherein "traffic signals" represent those signals in which, for instance, voice information is transferred. The reverse pilot signal is received at one or more WLS in block 602. The reverse pilot channels are monitored by the WLS. The received reverse pilot signal is correlated with a reference signal in block 604, typically at a GCS. The reference signal is generated, typically at a GCS, by using the unique PN code of the target mobile appliance and may be generated in much the same manner as the pilot signal is generated by the target mobile. The methodology and apparatus for creating the reference signal in block 603 is described in more detail in FIG. 7. The correlation provides a series of correlation values which if above a threshold indicates detection of the target mobile's reverse pilot signal. The peak correlation value may be used in block 606 to determine the time of arrival of the reverse pilot signal at the respective WLS. Each of the WLS is synchronized within the system and as such a time difference of arrival may be determined in block 608 for each of the respective WLS. An estimate of the location of the target mobile is generated in block 608 at the GCS based on the intersection of possible location hyperbolas generated from the TDOA at the WLS by methods that are well known in the art.

Figure 7:
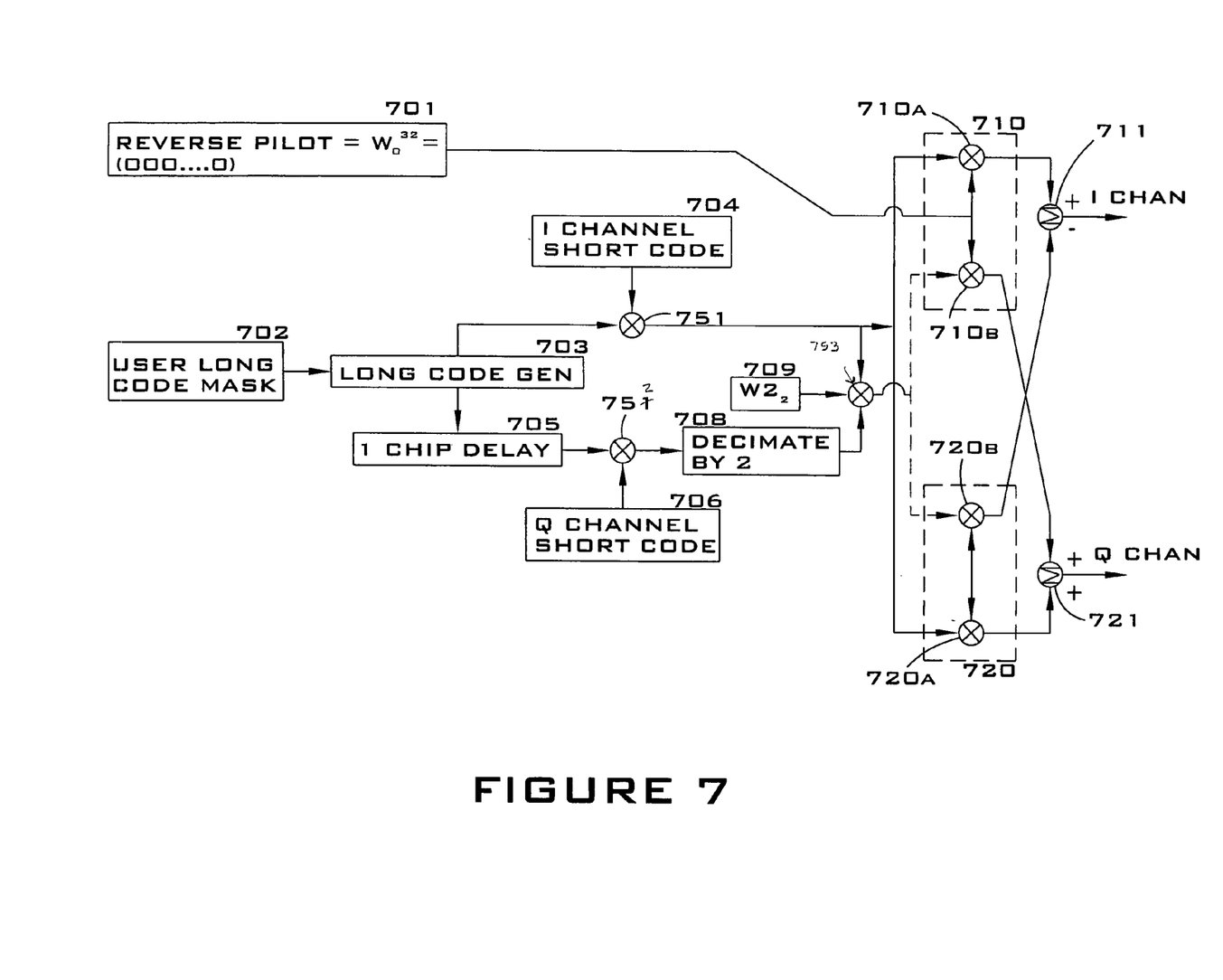
FIG. 7 is a representative schematic for generating a reference signal according to the present disclosure.

Detection of the reverse pilot signal can be accomplished by complex correlating the received signal with an internally generated reference signal of the pilot signal that has been complex scramble by the target mobile's unique long code sequence. The location of the peak of the correlation dictates the time of arrival of the signal at each receiver site. As is known in the art, complex correlation, correlation and cross-correlation all generally refer to processes in the time domain. A preferred approach to detection is to process the reverse pilot signal using an ambiguity function which jointly operates in the time and frequency domains. This approach allows detection and time of arrival estimation in the presence of a frequency difference between the reverse pilot signal and the reference which can occur due to Doppler effects and differences in local frequency references. From these multiple times of arrival, a geolocation can be performed using one of many widely known time difference of arrival estimation methods. FIG. 7 illustrates a method which may be used to generate a reference signal with which to estimate the geolocation of a target mobile. This reference signal may then be correlated with the received reverse pilot signal in order to detect the time of arrival of the reverse pilot signal from the target mobile as discussed above.

FIG. 7 is a schematic for the generation of a reference signal for detecting the reverse pilot signal from the target mobile appliance. As noted previously, the reverse pilot typically a Walsh code of all zeros $W_0^{32}$ as shown in block 701. The unique long code mask 702 dedicated to a specific mobile appliance is used to generate a long code 703. The long spreading code mask typically is a function of the ESN of the mobile appliance. The long code is mixed with an I channel short code 704 by mixer 751 forming a first code to be mixed downstream with other signals. The long code is also delayed or phase shifted in block 705 and mixed by mixer 752 with a Q channel short code 705, the result being decimated by 2 in block 708 and along with the resultant I mixed by mixer 753 with a Walsh code $W2_2$ (01) 709 to create a second code. The first and second codes are applied to mixer pairs 710 and 720 to be mixed with the $W_0^{32}$ Walsh code 701 of the pilot signal. The mixer pairs 710 and 720 each mix the first code and the second code with the Walsh code in mixers 710*a*, 720*a* and 710*b*, 720*b* respectively The mixer pairs are cross summed in summers 711 and 721 to produce the I channel and Q channel reference signal by which the target mobile's reverse pilot signal can be detected.

Since wideband CDMA ("WCDMA") is derived from a similar specification basis, it has the same provisions as IS2000 for channel estimation at the base station. WCDMA is the air interface standard selected for most of the Universal Mobile Telecommunication System ("UMTS") deployments in Europe and Asia, and is in serious consideration in parts of North and South America. As is known to those of skill in the art, the WCDMA communication system details are established by the Third Generation Partnership Project ("3GPP").

WCDMA features a reverse pilot on the Uplink Dedicated Channel in the Dedicated Physical Control Channel ("DPCCH"). WCDMA is an asynchronous system dependent on downlink synchronization channels to align the timing between all base stations and the mobile appliance. The DPCCH is transmitted continuously at a fixed spreading factor, making it always available to the base station radio for channel estimation While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of determining the location of a first mobile appliance in a wireless communication system, comprising the steps of:

(a) providing a reverse pilot channel;

(b) transmitting from said first mobile appliance a reverse pilot signal over said reverse pilot channel wherein said reverse pilot signal is different from reverse pilot signal emitted by other mobile appliances;

(c) recieving said first mobile appliance reverse pilot signal at a wireless location sensor;

(d) determining an attribute of said first mobile appliance reverse pilot signal at said wireless location sensor; and, (e) determining the location of said first mobile appliance as a function of said attribute, wherein said first mobile appliance reverse pilot signal is a digital signal generated from an information bit data sequence of zeros, and wherein said first mobile appliance reverse pilot signal is quadrature scrambled by a pseudo-random sequence that is a function of the ESN of said first mobile appliance.

2. The method of claim 1 wherein said attribute is selected from the group consisting of time of arrival, angle of arrival, and received power level.

3. The method of claim 1 wherein said first mobile appliance reverse pilot signal is received at a plurality of wireless location sensors.

4. The method of claim 3 wherein said attribute is time difference of arrival.

5. The method of claim 1 wherein step (c) includes the steps of:
   (c)(i) providing a reference signal at said wireless location sensor; and
   (c)(ii) detecting the presence of the first mobile appliance reverse pilot signal by cross-correlating in the time domain the received reverse pilot signal with said reference signal.

6. The method of claim 5 wherein step (c)(ii) includes cross-correlating in the time domain and the frequency domain the received reverse pilot signal with said reference signal.

7. The method of claim 5 wherein step (c)(ii) includes ambiguity function processing jointly in the time domain and the frequency domain the received reverse pilot signal with said reference signal.

8. The method of claim 1 wherein said wireless communication system includes at least one base station.

9. The method of claim 8 wherein said wireless location sensor is geographically spaced apart from said at least one base station.

10. The method of claim 1 wherein said wireless communication system is an asynchronous system.

11. The method of claim 1 wherein the location of the first mobile appliance is determined independent of the state of said first mobile appliance.

12. The method of determining the location of a first mobile appliance in a wireless communication system, comprising the steps of:
   (a) providing a reverse pilot channel;
   (b) transmitting from said first mobile appliance a reverse pilot signal over said reverse pilot channel wherein said reverse pilot signal is different from reverse pilot signals emitted by other mobile appliances;
   (c) receiving said first mobile appliance reverse pilot signal at a wireless location sensor, said receiving comprising:
      (c)(i) providing a reference signal at said wireless location sensor; and
      (c)(ii) detecting the presence of the first mobile appliance reverse pilot signal by cross-correlating in the time domain the received reverse pilot signal with said reference signal,
   (d) determining an attribute of said first mobile appliance reverse pilot signal at said wireless location sensor; and,
   (e) determining the location of said first mobile appliance as a function of said attribute,
   wherein said first mobile appliance reverse pilot signal is a digital signal generated from an information bit data sequence of zeros, and wherein step (c)(i) comprises the steps of:
   (c)(i)(A) generating a sequence of zeros;
   (c)(i)(B) generating a long spreading code using the long code mask of said first mobile appliance; and
   (c)(i)(C) applying said long spreading code to an I channed short code and applying said long spreading code to a Q channel short code.

13. A method of determining the location of a first mobile appliance in a wireless communication system, comprising the steps of:
   (a) providing a reverse pilot channel;
   (b) transmitting from said first mobile appliance a reverse pilot signal over said reverse pilot channel wherein said reverse pilot signal is different from reverse pilot signals emitted by other mobile appliances;
   (c) receiving said first mobile appliance reverse pilot signal at a wireless location sensor;
   (d) determining an attribute of said first mobile appliance reverse pilot signal a said wireless location sensor; and,
   (e) determining the location of said first mobile appliance as a function of said attribute,
   wherein the reverse pilot signal of each mobile appliance is a pseudo-random sequence that is substantially orthogonal to the pseudo-random sequence generated by each of the other mobile appliances.

14. The method of claim 13 wherein said attribute is selected from the group consisting of time of arrival, angle of arrival, and received power level.

15. The method of claim 13 wherein said first mobile appliance reverse pilot signal is received at a plurality of wireless location sensors.

16. The method of claim 15 wherein said attribute is time difference of arrival.

17. The method of claim 13 wherein step (c) includes the steps of:
   (c)(i) providing a reference signal at said wireless location sensor; and
   (c)(ii) detecting the presence of the first mobile appliance reverse pilot signal by cross-correlating in the time domain the received reverse pilot signal with said reference signal.

18. The method of claim 17 wherein step (c)(ii) includes cross-correlating in the time domain and the frequency domain the received reverse pilot signal with said reference signal.

19. The method of claim 17 wherein step (c)(ii) includes ambiguity function processing jointly in the time domain and the frequence domain the received reverse pilot signal with said reference signal.

20. The method of claim 13 wherein said wireless communication system includes at least one base station.

21. The method of claim 20 wherein said wireless location sensor is geographically spaced apart from said at least one base station.

22. The method of claim 13 wherein said wireless communication system is an asynchronous system.

23. The method of claim 13 wherein the location of the first mobile appliance is determined independent of the state of said first mobile appliance.

24. A method of determining the location of a first mobile appliance in a wireless communication system, comprising the steps of:
   (a) providing a reverse pilot channel;
   (b) transmitting from said first mobile appliance a reverse pilot signal over said reverse pilot channel wherein said reverse pilot signal is different from reverse pilot signals emitted by other mobile appliances;
   (c) receiving said first mobile appliance reverse pilot signal at a wireless location sensor including the steps of
      (c)(i) providing a reference signal at said wireless location sensor by generating a sequence of zeros, generating a long spreading code using the long code mask of said first mobile appliance, and applying said long spreading code to an I channel short code and applying said long spreading code to a Q channel short code; and
      (c)(ii) detecting the presence of the first mobile appliance reverse pilot signal by cross-correlating in the time domain the received reverse pilot signal with said reference signal;

(d) determining an attribute of said first mobile appliance reverse pilot signal a said wireless location sensor; and, (e) determining the location of said first mobile appliance as a function of said attribute.

25. The method of claim 24 wherein said attribute is selected from the group consisting of time of arrival, angle of arrival, and received power level.

26. The method of claim 24 wherein said first mobile appliance reverse pilot signal is received at a plurality of wireless location sensors.

27. The method of claim 26 wherein said attribute is time difference of arrival.

28. The method of claim 24 wherein step (c)(ii) includes cross-correlating in the time domain and the frequency domain the received reverse pilot signal with reference signal.

29. The method of claim 24 wherein step (c)(ii) includes ambiguity function processing jointly in the time domain and the frequency domain the received reverse pilot signal with said reference signal.

30. The method of claim 24 wherein said wireless communication system includes at least one base station.

31. The method of claim 30 wherein said wireless location sensor is geographically spaced apart from said at least one base station.

32. The method of claim 24 wherein said wireless communication system is an asynchronous system.

33. The method of claim 24 wherein the location of the first mobile appliance is determined independent of the state of said first mobile appliance.

34. The method for estimating the location of a mobile appliance in a wireless communication system including at least one base station and a plurality of geolocation receiver sites, comprising the steps of:

transmitting from said mobile appliance a known spread spectrum sequence for establishing synchronization between said mobile appliance and said at least one base station;

receiving said sequence at ones of said plural geolocation receiver sites;

cross-correlating in the time domain and the frequency domain the received sequence with a reference sequence to thereby determine an attribute of said receiced sequence at said ones of said plural geolocation receiver sites; and, estimating the location of the mobile appliance as a function of said attribute, wherein the known spread spectrum sequence of the mobile appliance is a pseudo-random sequence that is substantially orthogonal to the pseudo-random sequence generated by other mobile appliances.

35. The method of claim 34 wherein one of said plural geolocation receiver sites is geographically spaced apart from any of said at least one base station.

36. The method of claim 34 wherein said spread spectrum sequence is transmitted continuously.

37. The method of claim 34 wherein the wireless communication system is an asynchronous system.

38. The method of claim 34 wherein the location of the first mobile appliance is determined independent of the state of said first mobile appliance.

39. The method of claim 34 wherein the step of cross-correlating in the time domain and the frequency domain is replaced by ambiguity function processing jointly in the time domain and the frequency domain.

40. A method for estimating the location of a mobile appliance in a wireless communication system including at least one base station and a plurality of geolocation receiver sites, comprising the steps of:

transmitting from said mobile appliance a known spread spectrum sequence for establishing synchronization between said mobile appliance and said at least one base station;

receiving said sequence at ones of said plural geolocation receiver sites including the steps of providing a reference sequence by generating a sequence of zeros, generating a long spreading code using the long code mask of said mobile appliance, and applying said long spreading code to an I channel short code and applying said long spreading code to a Q channel short code; and detecting cross-correlating in the time domain and the frequency domain the received sequence with the reference sequence to thereby determine an attribute of said received sequence at said ones of said plural geolocation receiver sites; and, estimating the location of the mobile appliance as a function of said attribute.

41. The method of claim 40 wherein one of said plural geolocation receiver sites is geographically spaced apart from any of said at least one base station.

42. The method of claim 40 wherein said spread spectrum sequence is transmitted continuously.

43. The method of claim 40 wherein the wireless communication system is an asynchronous system.

44. The method of claim 40 wherein the location of the first mobile appliance is determined independent of the state of said first mobile appliance.

45. The method of claim 40 wherein the step of cross-correlating in the time domain and the frequency domain is replaced by ambiguity function processing jointly in the time domain and the frequency domain.

46. A system for estimating the location of a first mobile appliance, comprising:

said first mobile appliance including means for emitting a reverse pilot signal different from pilot signals emitted by other mobile appliances;

at least one wireless location sensor including means for receiving said first mobile appliance reverse pilot signal; and a geolocation control server operatively connected to said at least one wireless location sensor for determining an attribute of said received reverse pilot signal and estimating the location of said first mobile appliance as a function of said attribute, wherein said first mobile appliance reverse pilot signal is a digital signal generated from an information bit data sequence of zeros, wherein said first mobile appliance is operating in a wireless communication system having at least one base station for communicating with said mobile appliance, and where said reverse pilot signal emitted from said first mobile appliance is used by said at least one base station to coherently demodulate a traffic signal emitted by said first mobile appliance.

47. The system of claim 46 wherein said attribute is selected from the group consisting of time of arrival, angle of arrival, and received power level.

48. The system of claim 46 including a plurality of wireless location sensors.

49. The system of claim 48 wherein said attribute is time difference of arrival.

50. The system of claim 46 wherein said wireless location sensor is geographically spaced apart from said at least one base station.

51. The system of claim 46 wherein the wireless communication system is an asynchronous system.

52. The system of claim 46 wherein said system is a network overlay location system.

53. A system for estimating the location of a first mobile appliance, comprising:
   said first mobile appliance including means for emitting a reverse pilot signal different from pilot signals emitted by other mobile appliances;
   at least one wireless location sensor including means for receiving said first mobile appliance reverse pilot signal; and
   a geolocation control server operatively connected to said at least one wireless location sensor for determining an attribute of said received reverse pilot signal and estimating the location of said first mobile appliance as a function of said attribute,
   wherein said first mobile appliance reverse pilot signal is a digital signal generated from an information bit data sequence of zeros, and wherein said reverse pilot signal emitted from said first mobile appliance is generated as a function of a long spreading code for said first mobile appliance.

54. A system for estimating the location of a first mobile appliance, comprising:
   said first mobile appliance including means for emitting a reverse pilot signal different from pilot signals emitted by other mobile appliances; at least one wireless location sensor including means for receiving said first mobile appliance reverse pilot signal; and
   a geolocation control server operatively connected to said at least one wireless location sensor for determining an attribute of said received reverse pilot signal and estimating the location of said first mobile appliance as a function of said attribute,
   wherein said first mobile appliance reverse pilot signal is a digital signal generated from an information bit data sequence of zeros, and wherein said geolocation control server includes:
   a reference signal generator for generating a reference signal;
   a cross-correlation or ambiguity function device for determining said attribute of said received reverse pilot signal; and
   a location estimator for estimating the location of said first mobile appliance as a function of said attribute.

55. The system of claim 54 wherein said cross-correlation or ambiguity function device determines the time difference of arrival of said received reverse pilot signal for at least two of said wireless location sensors and wherein said location estimator estimates the location of said first mobile appliance as a function of said time difference of arrival.

56. A system for estimating the location of a first mobile appliance, comprising:
   said mobile appliance including means for emitting a reverse pilot signal different from pilot signals emitted by other mobile appliances;
   at least one wireless location sensor including means for receiving said first mobile appliance reverse pilot signal; and
   a geolocation control server operatively connected to said at least one wireless location sensor for determining an attribute of said received reverse pilot signal and estimating the location of said first mobile appliance as a function of said attribute,
   wherein said first mobile appliance reverse pilot signal is a digital signal generated from an information bit data sequence of zeros, and wherein the location of the first mobile appliance is determined independent of the state of said first mobile appliance.

57. A system for estimating the location of a first mobile appliance, comprising:
   said first mobile appliance including means for emitting a reverse pilot signal different from pilot signals emitted by other mobile appliances;
   at least one wireless location sensor including means for receiving said first mobile appliance reverse pilot signal; and
   a geolocation control server operatively connected to said at least one wireless location sensor for determining an attribute of said received reverse pilot signal and estimating the location of said first mobile appliance as a function of said attribute,
   wherein the reverse pilot signal of each mobile appliance is a pseudo-random sequence that is substantially orthogonal to the pseudo-random sequence generated by each of the other mobile appliances.

58. The system of claim 57 wherein said first mobile appliance is operating in a wireless communication system having at least one base station for communicating with said mobile appliance.

59. The system of claim 58 wherein said attribute is selected from the group consisting of time arrival, angle of arrival, and received power level.

60. The system of claim 58 including a plurality of wireless location sensors.

61. The system of claim 60 wherein said attribute is time difference of arrival.

62. The system of claim 61 wherein the step of determining the time difference of arrival includes correlating said reverse pilot signal with a reference signal.

63. The system of claim 61 wherein the step of determining the time difference of arrival includes ambiguity function processing of said reverse pilot signal with a reference signal.

64. The system of claim 58 wherein said wireless location sensor is geographically spaced apart from said at least one base station.

65. The system of claim 58 wherein the wireless communication system is an asynchronous system.

66. The system of claim 58 wherein said reverse pilot signal emitted from said first mobile appliance is used by said at least one base station to coherently demodulate a traffic signal emitted by said first mobile appliance.

67. The system of claim 58 wherein said system is a network overlay location system.

68. The system of claim 57 wherein said geolocation control server includes:
   a reference signal generator for generating a reference signal;
   a cross-correlation or ambiguity function device for determining said attribute of said received pilot signal; and
   a location estimator for estimating the location of said first mobile appliance as a function of said attribute.

69. The system of claim 68 wherein said cross-correlation or ambiguity function device determines the time difference of arrival of said received reverse pilot signal for at least two of said wireless location sensors and wherein said location estimator estimates the location of said first mobile appliance as a function of said time difference of arrival.

70. The system of claim 57 wherein the location of the first mobile appliance is determined of the state of said first mobile appliance.

71. A system for estimating the location of a first mobile appliance, comprising:
- said first mobile appliance including means for emitting a known spread spectrum sequence for establishing synchronization between said mobile appliance and said at least one base station;
- plural geolocation receiver sites including means for receiving said sequence; and
- a geolocation control server operatively connected to said at least one receiver site for cross-correlating in the time domain and the frequency domain the received sequence with a reference sequence to thereby determine an attribute of said received sequence at said ones of said plural geolocation receiver sites and estimating the location of said mobile appliance as a function of said attribute
- wherein said mobile appliance spread spectrum sequence is a digital signal generated from an information bit data sequence of zeros.

72. A location system for estimating the location of a first mobile appliance, comprising:
- said first mobile appliance including means for emitting a known spread spectrum sequence for establishing synchronization between said mobile appliance and said at least one base station;
- plural geolocation receiver sites including means for receiving said sequence; and
- a geolocation control server operatively connected to said at least one receiver site for cross-correlating in the time domain and the frequency domain the received sequence with a reference sequence to thereby determine an attribute of said received sequence at said ones of said plural geolocation receiver sites and estimating the location of said mobile appliance as a function of said attribute
- wherein the known spread spectrum sequence of the mobile appliance is a pseudo-random sequence that is substantially orthogonal to the pseudo-random sequence generated by other mobile appliances.

* * * * *